United States Patent
Hattori et al.

(10) Patent No.: US 7,644,071 B1
(45) Date of Patent: Jan. 5, 2010

(54) SELECTIVE DISPLAY OF TARGET AREAS IN A DOCUMENT

(75) Inventors: Yohichi Hattori, Yokohama (JP); Takahito Hosokawa, Kawasaki (JP); Seiji Yamada, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/198,565

(22) Filed: Aug. 26, 2008

(51) Int. Cl.
*G06F 7/00* (2006.01)
*G06F 17/30* (2006.01)

(52) U.S. Cl. .......................... 707/3; 715/243; 715/254; 715/277

(58) Field of Classification Search .................. 707/3, 707/104.1; 715/200, 234, 235, 240, 241, 715/243, 244, 246, 247, 252, 253, 254, 273, 715/277
See application file for complete search history.

(56) References Cited

U.S. PATENT DOCUMENTS

| | | | | |
|---|---|---|---|---|
| 4,992,972 A | * | 2/1991 | Brooks et al. | 715/708 |
| 5,479,600 A | * | 12/1995 | Wroblewski et al. | 715/787 |
| 5,644,686 A | * | 7/1997 | Hekmatpour | 706/45 |
| 5,963,965 A | * | 10/1999 | Vogel | 715/236 |
| 6,006,227 A | * | 12/1999 | Freeman et al. | 707/7 |
| 6,334,132 B1 | * | 12/2001 | Weeks | 707/101 |
| 6,457,026 B1 | | 9/2002 | Graham et al. | |
| 6,553,373 B2 | * | 4/2003 | Boguraev et al. | 707/5 |
| 6,647,156 B1 | * | 11/2003 | Meding | 382/305 |
| 2004/0139400 A1 | * | 7/2004 | Allam et al. | 715/526 |
| 2005/0028108 A1 | * | 2/2005 | Baudisch et al. | 715/801 |
| 2005/0216457 A1 | * | 9/2005 | Walther et al. | 707/4 |
| 2006/0047646 A1 | * | 3/2006 | Maluf et al. | 707/4 |
| 2007/0219945 A1 | | 9/2007 | Wang et al. | |
| 2007/0288498 A1 | | 12/2007 | Dietz et al. | |
| 2008/0071743 A1 | | 3/2008 | Jhaveri et al. | |
| 2008/0109407 A1 | * | 5/2008 | Kirkland et al. | 707/3 |
| 2008/0148147 A1 | * | 6/2008 | Poston et al. | 715/273 |

FOREIGN PATENT DOCUMENTS

WO   WO 2006094557 A1 * 9/2006

* cited by examiner

*Primary Examiner*—James K. Trujillo
*Assistant Examiner*—Marc Somers
(74) *Attorney, Agent, or Firm*—Yee & Associates, P.C.; Ingrid M. Foerster (57) ABSTRACT

A computer implemented method searches for keywords within a document and displays a surrounding context. A keyword search term and a view area size for the document are received. A plurality of occurrences of the search term is identified within the document. A view area size surrounding each occurrences of the search term is identified to form a plurality of view area sizes. An edited view of the document is displayed. The edited view includes a sequence of the plurality of view area sizes, wherein each of the plurality of view area sizes are separated by one of a plurality of interactive virtual boundary lines, and each of the a plurality of interactive virtual boundary lines have an indicator to form a plurality of indicators.

3 Claims, 6 Drawing Sheets

SELECTIVE DISPLAY OF TARGET AREAS IN A DOCUMENT

BACKGROUND OF THE INVENTION

1. Field of the Invention

The present invention relates generally to computer implemented methods. More specifically, the present invention relates to a computer implemented method for selectively displaying searched keywords and the surrounding contexts within a document.

2. Description of the Related Art

With the increasing amount of information that is available to users via today's computer systems, efficient techniques for locating information of interest are becoming essential. Even if a user locates a document of interest, often times, information is scattered throughout the document. A user is then forced to review, or search the document for occurrences of the specific topic of interest.

However, when searching documents, it is often difficult to identify and display the useful information distributed in a document in a format that is easily accessible to the user. Different occurrences of the topic of interest can be distributed throughout the document, such that simultaneous display of those occurrences within a browser window is difficult at best. If a user wants to simultaneously display several occurrences of remotely located useful information in a document within a browser window, the user will typically have two choices. First, a user can launch multiple browser window screens for the same document application, and then locate appropriate occurrences of the topic for display in the separate browser windows. Alternatively, if the browser application has a split screen functionality, the user can split the individual portion of the window. A search can then be performed for the appropriate occurrences of the topic for display, and those occurrences displayed within each split view.

BRIEF SUMMARY OF THE INVENTION

A computer implemented method searches for keywords within a document and displays a surrounding context. A keyword search term and a view area size for the document are received. A plurality of occurrences of the search term is identified within the document. A view area size surrounding each occurrence of the search term is identified to form a plurality of view area sizes. An edited view of the document is displayed. The edited view includes a sequence of the plurality of view area sizes, wherein each of the plurality of view area sizes are separated by one of a plurality of interactive virtual boundary lines, and each of the a plurality of interactive virtual boundary lines have an indicator to form a plurality of indicators.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
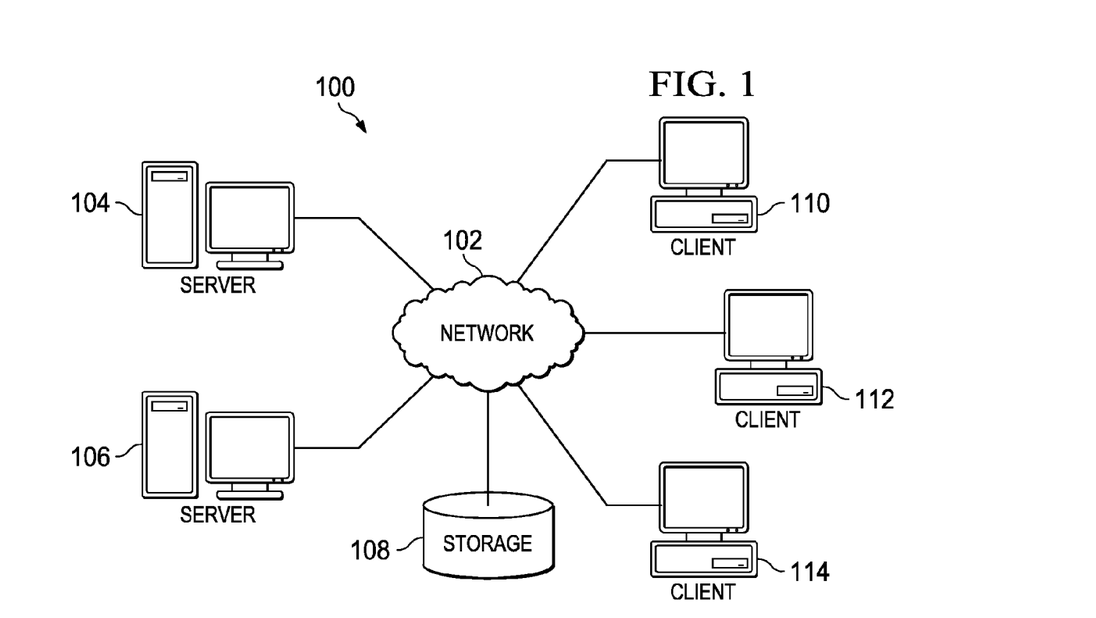
FIG. 1 is a pictorial representation of a network of data processing systems in which illustrative embodiments may be implemented.
Figure 2:
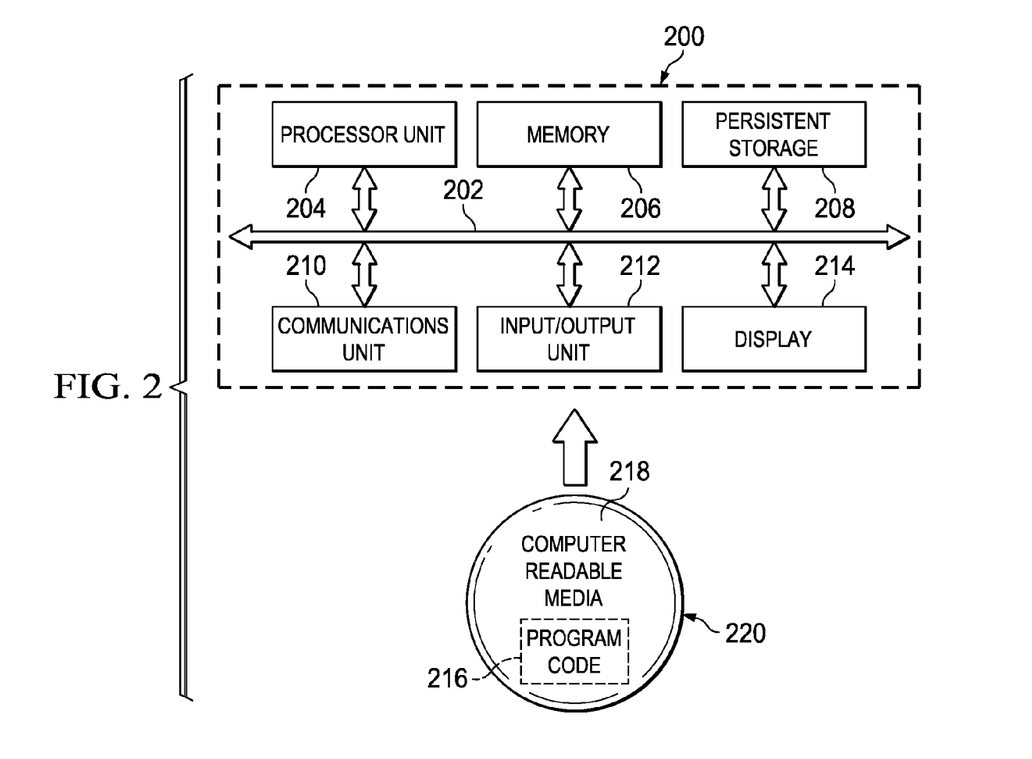
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wired, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A computer implemented method searches for keywords within a document and displays a surrounding context. A keyword search term and a view area size for the document are received. A plurality of occurrences of the search term is identified within the document. A view area size surrounding each occurrence of the search term is identified to form a plurality of view area sizes. An edited view of the document is displayed. The edited view includes a sequence of the plurality of view area sizes, wherein each of the plurality of view area sizes are separated by one of a plurality of interactive virtual boundary lines, and each of the a plurality of interactive virtual boundary lines have an indicator to form a plurality of indicators.

Figure 3:
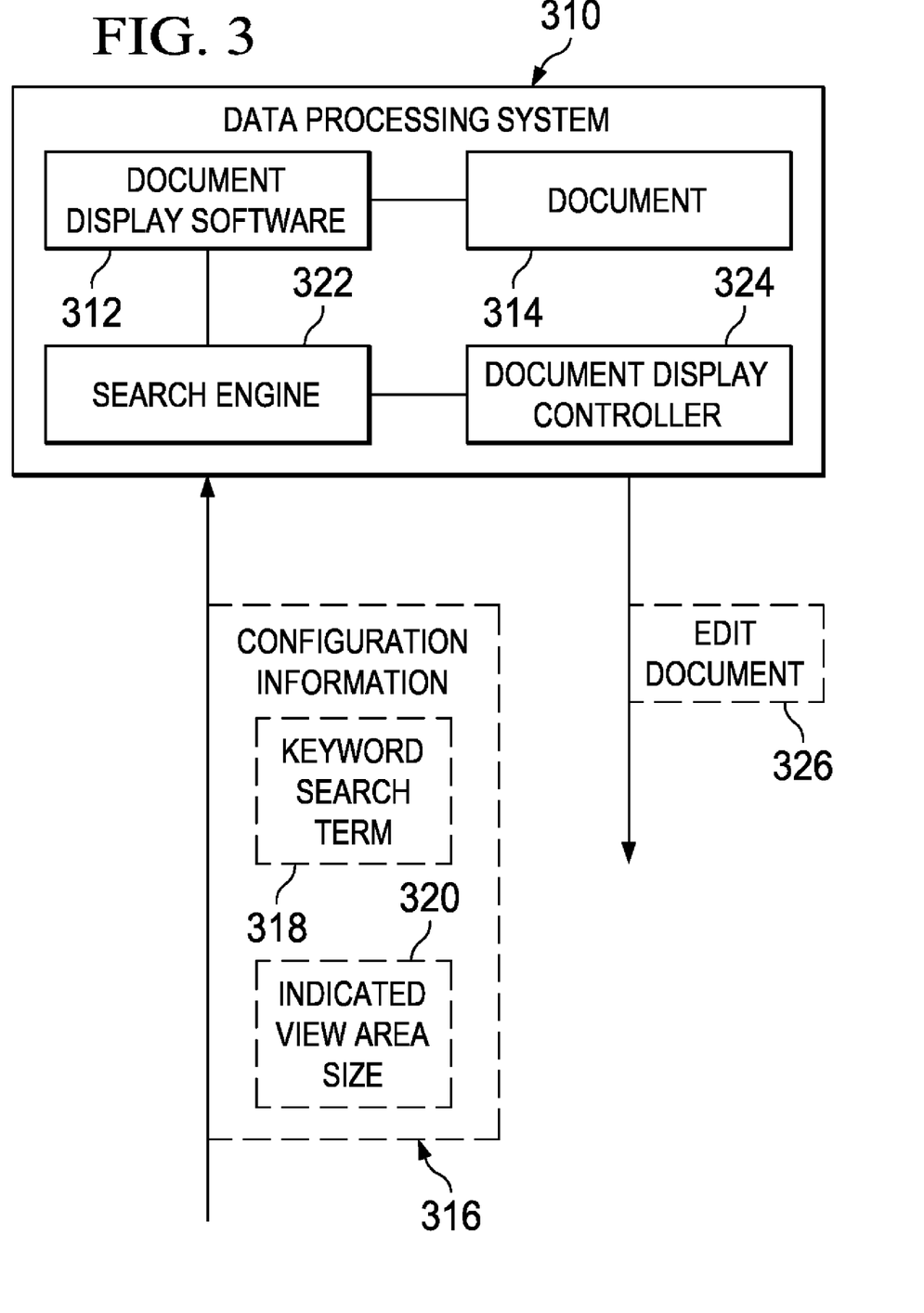
FIG. 3 a data flow diagram depicting various software and hardware components according to an illustrative embodiment.

Referring now to FIG. 3, a data flow diagram depicting various software and hardware components is shown according to an illustrative embodiment. Data processing system 310 can be one of clients 110, 112, and 114 of FIG. 1.

Data processing system 310 contains document display software 312. Document display software 312 is a software component capable of accessing and displaying documents.

Document display software 312 accesses document 314. While document 314 is shown as existing on data processing system 310, it is appreciated that document 314 can exist elsewhere, such as, for example, without limitation, on storage unit 108 of FIG. 1.

A user inputs configuration information 316 into document data processing system 310. Configuration information 316 includes keyword search term 318 and indicated view area size 320.

Keyword search term 318 is a line or string that a user wishes to locate within document 314. Indicated view area size 320 is a desired contextual size that the user wishes to retrieve along with keyword search term 318. Indicated view area size 320 can be expressed in characters, lines of text, sentences, or other measures of the surrounding context that should be retrieved and displayed along with keyword search term 318.

Data processing system 300 utilizes search engine 322 to parse document 314 for occurrences of keyword search term 318. Search engine 322 is a software process, which can be implemented as a packaged part of document display software 312, or as a separate plug-in component that works in conjunction with document display software 312.

Document display controller 324 is a software component that works in conjunction with document display software 312 and search engine 322 to present the user with edited document 326. Document display controller 324 receives a parse from search engine 322 of each occurrence of keyword search term 318 within document 314. Document display controller 324 then accumulates each of these occurrences into a contiguous sequence, listing each of the occurrences of keyword search term 318, and showing the context surrounding those occurrences. Document display controller 324 then presents the contiguous sequence of occurrences to a user in edited document 326.

Figure 4:
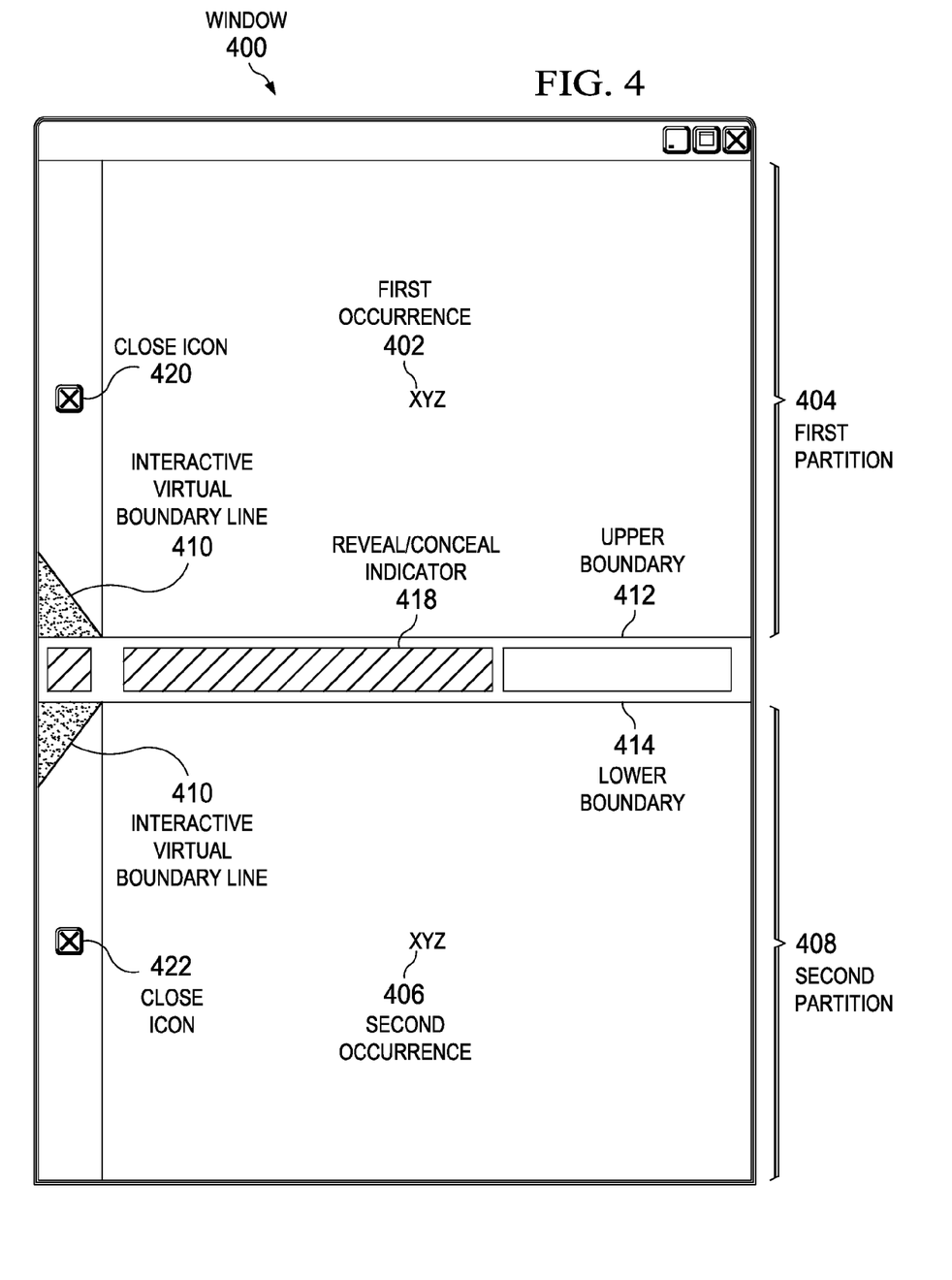
FIG. 4 is a pictorial representation of a window having a plurality of view areas according to an illustrative embodiment.

Referring now to FIG. 4, a pictorial representation of a window having a plurality of view areas is shown according to an illustrative embodiment. Window 400 is an edited view of a document, such as edited document 326 of FIG. 3.

Window 400 includes first occurrence 402 of a keyword search term, such as keyword search term 318 of FIG. 3. The context surrounding first occurrence 402 is presented responsive to an indicated view area size, such as indicated view area size 320 of FIG. 3. First occurrence 402 and its surrounding context comprise first partition 404.

Window 400 includes second occurrence 406 of a keyword search term. The context surrounding second occurrence 406 is presented responsive to an indicated view area size, such as view area size 320 of FIG. 3. Second occurrence 406 and its surrounding context comprise second partition 408.

Separating first partition 404 from second partition 408 is interactive virtual boundary line 410. Interactive virtual boundary line 410 is a divider that separates window 400 into various partitions, such as first partition 404 and second partition 408, wherein each partition consisting of an occurrence of the keyword search term, and the context surrounds that particular occurrence of the keyword search term according to the view area size.

Portions of the document that are not part of a context surrounding a particular occurrence of the keyword search term are concealed. Window 400 therefore presents a contiguous sequence of first partition 404 and second partition 408, concealing any portions of the document that are not an occurrence of the keyword search term, or a context surrounding the keyword search term as determined by the indicated view area size.

Interactive virtual boundary line 410 is manipulatable by a user. A user can interact with virtual boundary line 410 in order to resize, conceal, or scan first partition 404 and second partition 408.

In an illustrative embodiment, interactive virtual boundary line 410 is a bifurcated boundary line, comprising upper boundary 412 and lower boundary 414. By interacting with upper boundary 412, a user can choose to extend or shorten the view area size of first partition 404. Similarly, by interacting with lower boundary 414, a user can choose to extend or shorten the view area size of second partition 408. By maintaining the bifurcated boundary line, partitions can be resized, concealed, or scanned without affecting the view area size of adjacent partitions.

In another illustrative embodiment, manipulation of upper boundary 412 and lower boundary 414 can allow a user to pan through those concealed portions of the document, without resizing the relevant partition. Manipulation of upper boundary 412 would therefore reveal a previously concealed portion of the document, while obscuring a portion of the context revealed in partition 404. Similarly, manipulation of lower boundary 414 would reveal a previously concealed portion of the document, while obscuring a portion of the context revealed in partition 408. In both cases, the view area size of partitions 404 and 408 would remain constant.

Interactive virtual boundary line 410 may also include reveal/conceal indicator 418. Reveal/conceal indicator 418 is a graphical indication of the amount of the document that is presently concealed between first partition 404 and second partition 408. Manipulation of either upper boundary 412 or lower boundary 414 causes a visual change in reveal/conceal indicator 418 as concealed portions of the document between first partition 404 and second partition 408 are revealed. Similarly, a visual change in reveal/conceal indicator 418 occurs as revealed portions of first partition 404 and second partition 408 are concealed by manipulation of either upper boundary 412 or lower boundary 414.

In an illustrative embodiment, first partition 404 and second partition 408 can each be provided one of close-icons 420 and 422. Close-icons 420 and 422 are icons for the removal of an unwanted partition from window 400. Thus, when a user clicks close-icon 420, first partition 404 will be removed from window 400. The context of first partition 404 will therefore become concealed to the user. Similarly, when a user clicks close-icon 422, second partition 408 will be removed from window 400.

Figure 5:
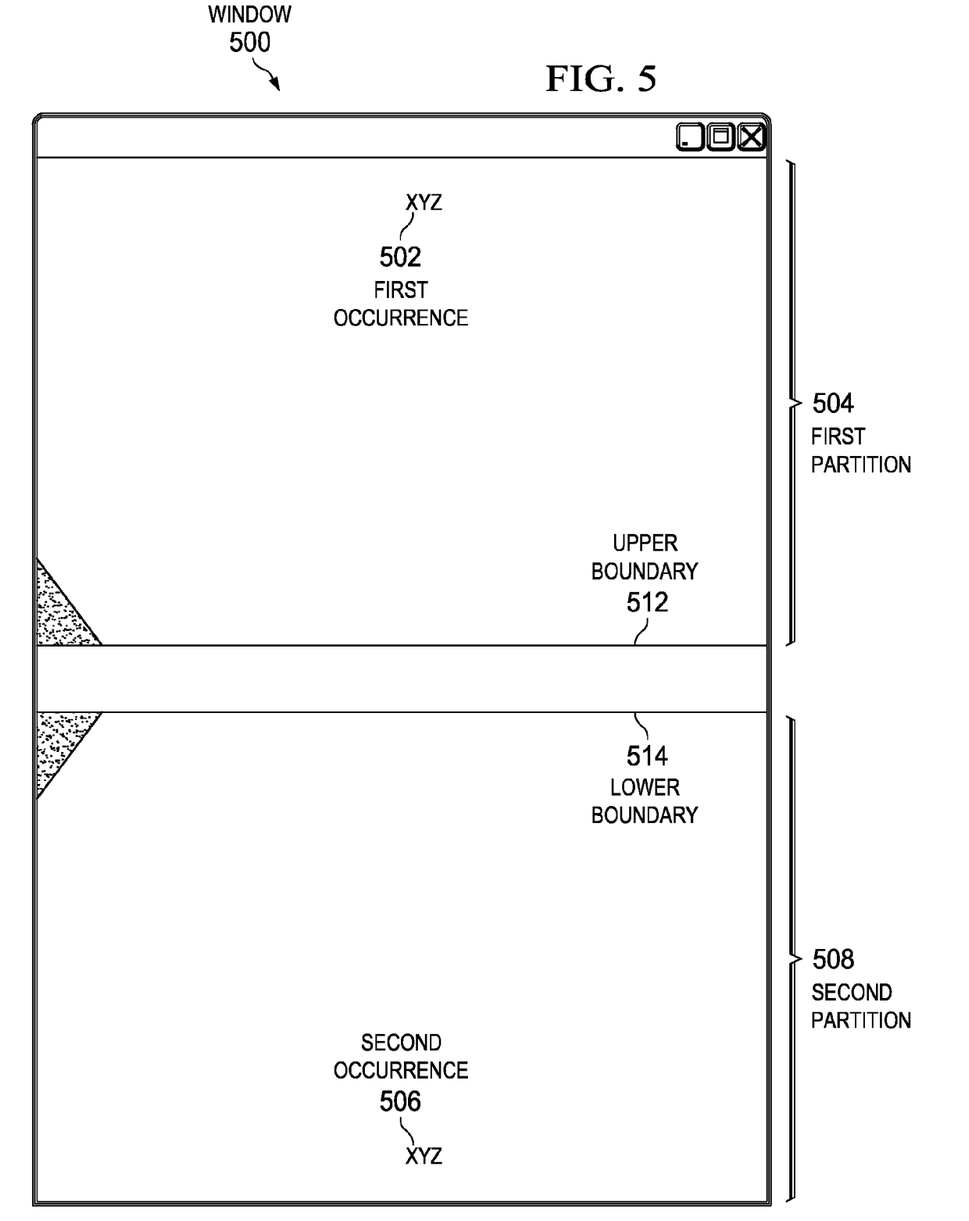
FIG. 5 is a pictorial representation of a window having a plurality of view areas after manipulation of an interactive boundary line according to an illustrative embodiment.

Referring now to FIG. 5, a pictorial representation of a window having a plurality of view areas after manipulation of an interactive boundary line is shown according to an illustrative embodiment. Window 500 is Window 400 of FIG. 4.

Upper boundary 512 has been manipulated by the user, such that the context within first partition 504 has shifted. In one illustrative embodiment, a user has dragged upper boundary 512 toward the bottom of window 500, indicating that the user desires to see previously concealed contents of the document occurring after the context that is initially displayed in first partition 404 of FIG. 4. The context of first partition 504 therefore shifts to show that portion of the document that was previously concealed beneath the initial displayed context of first partition 404 of FIG. 4. First occurrence 502 is correspondingly scrolled to the top of first partition 504.

Similarly, lower boundary 514 has been manipulated by the user, such that the context within second partition 508 has shifted. In one illustrative embodiment, a user has dragged lower boundary 514 toward the top of window 500, indicating that the user desires to see previously concealed contents of the document occurring prior to the context that is initially displayed in second partition 408 of FIG. 4. The context of second partition 508 therefore shifts to show that portion of the document that was previously concealed above the initial displayed context of first partition 404 of FIG. 4. Second occurrence 506 is correspondingly scrolled to the bottom of second partition 508.

Figure 6:
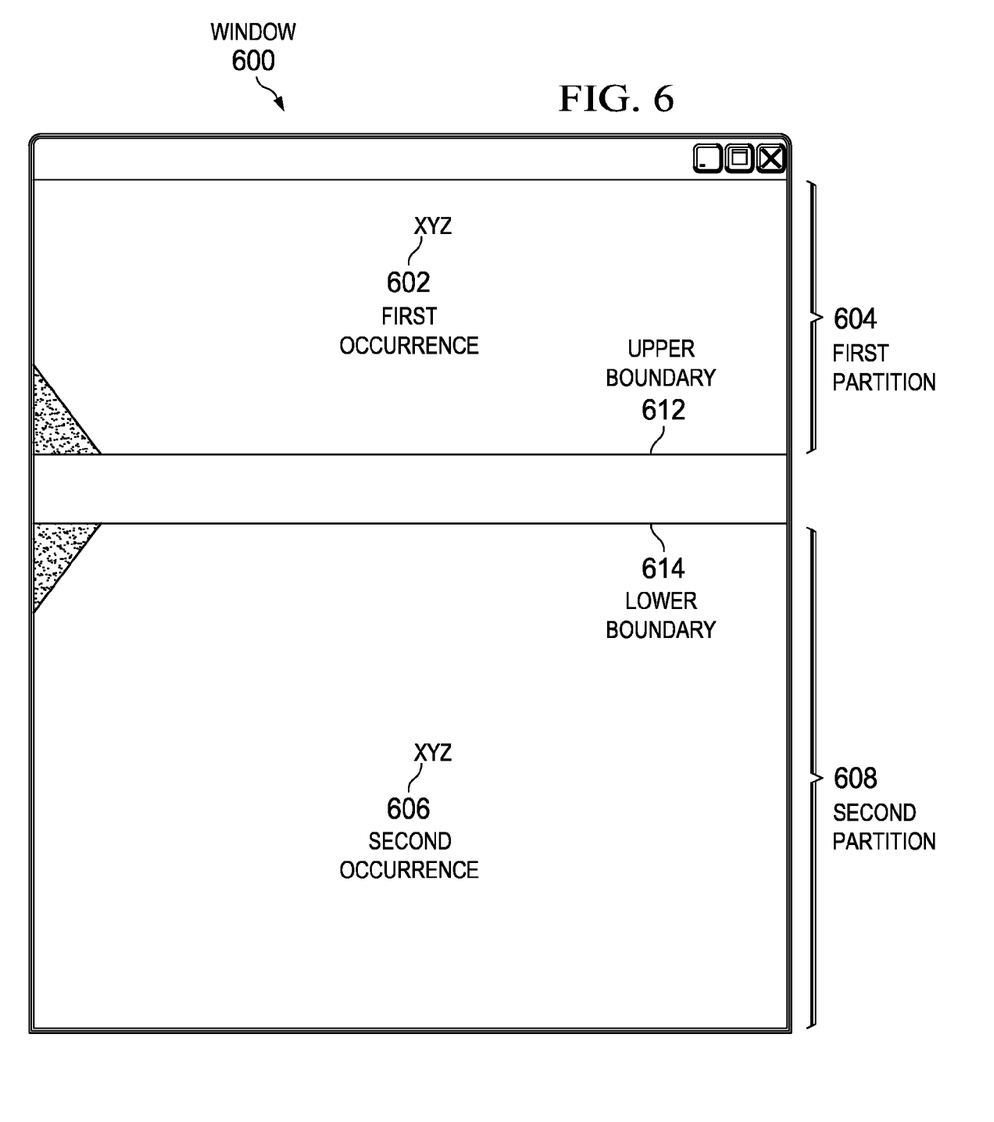
FIG. 6 is a pictorial representation of a window having a plurality of view areas after manipulation of an interactive boundary line according to an illustrative embodiment.

Referring now to FIG. 6, a pictorial representation of a window having a plurality of view areas after manipulation of an interactive boundary line is shown according to an illustrative embodiment. Window 600 is Window 400 of FIG. 4.

Upper boundary 612 has been manipulated by the user, such that the view area size of first partition 604 has reduced. In one illustrative embodiment, a user has dragged upper boundary 612 toward the top of window 600, indicating that the user desires to see less of the shown context within first partition 604. The view area size of first partition 604 is therefore reduced. In one illustrative embodiment, first occurrence 602 can remain approximately centered within first partition 604 despite the reduction of the view area size of first partition 604.

Similarly, lower boundary 614 has been manipulated by the user, such that the view area size of second partition 608 has reduced. In one illustrative embodiment, a user has dragged lower boundary 614 toward the top of window 600, indicating that the user desires to see more of the context surrounding second partition 608. The view area size of second partition 608 is therefore increased. In one illustrative embodiment, second occurrence 606 can remain approximately centered within second partition 608 despite the increase of the view area size of second partition 608.

Figure 7:
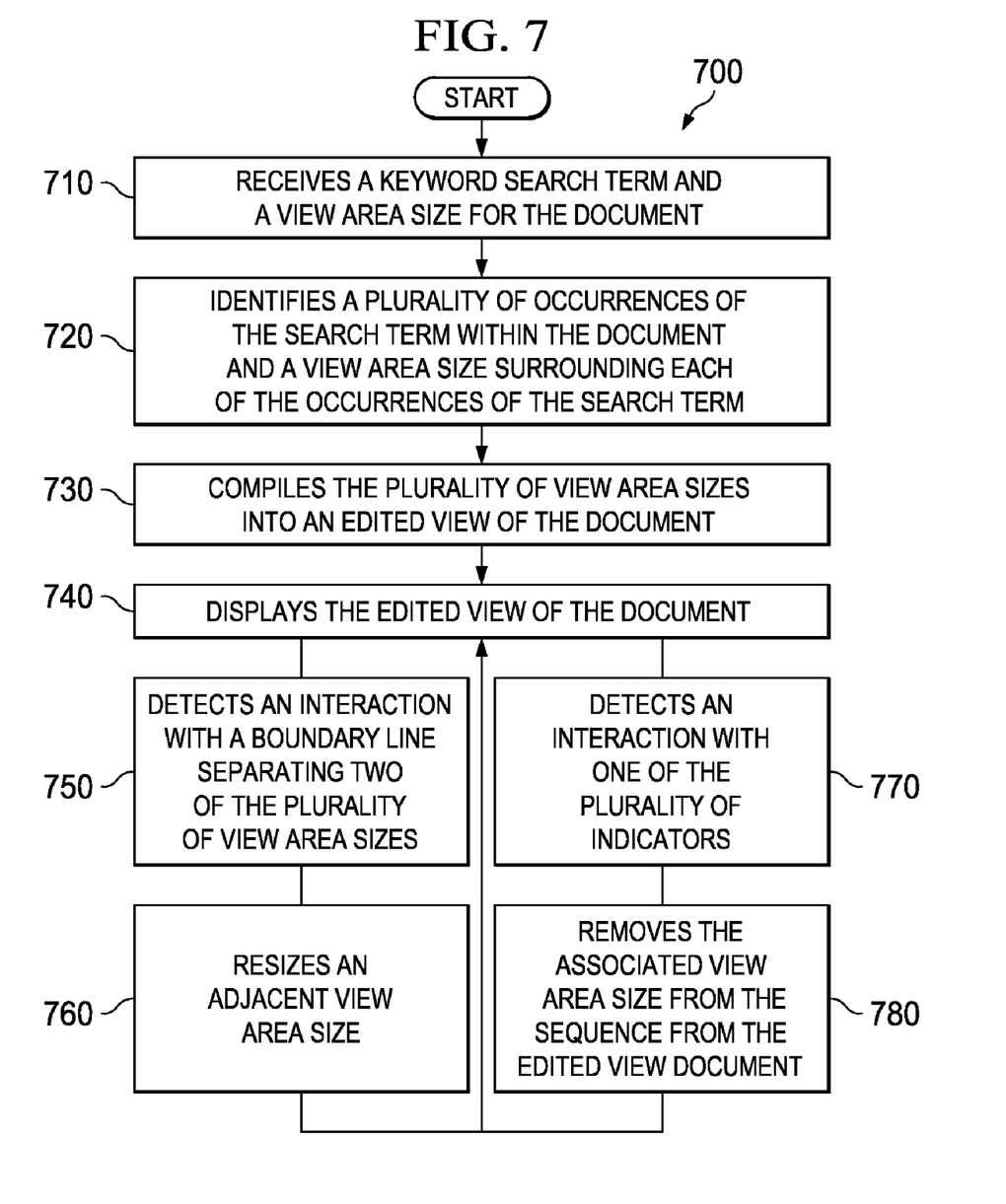
FIG. 7 is a process flowchart for searching for a keyword within a document displaying an edited document in response thereto according to an illustrative embodiment.

Referring now to FIG. 7, a process flow chart for searching for a keyword within a document displaying an edited document in response thereto is shown according to an illustrative embodiment. Process 700 is a software process, executing on a software component, such as 322 of FIG. 3.

Process 700 begins by receiving a keyword search term and a view area size for the document (step 710). The keyword search term can be keyword search term 318 of FIG. 3. The view area size can be view area size 320 of FIG. 3.

Responsive to receiving the keyword search term and a view area size, process 700 identifies a plurality of occurrences of the search term within the document and a view area size surrounding each of occurrences of the search term (step 720). The view area size surrounding the identified search term includes the context of the document that lies within the view area indicated in step 710. The plurality of identified occurrences of the keyword search term, and their surrounding view area sizes together form a plurality of view area sizes.

Responsive to identifying the plurality of occurrences of the search term within the document, process 700 compiles the plurality of view area sizes into an edited view of the document (step 730). The edited view of the document is a contiguous sequence of the plurality of view area sizes.

Responsive to compiling the plurality of view area sizes into an edited view of the document, process 700 displays the edited view of the document (step 740). The edited view can be displayed in a window, such as window 400 of FIG. 4. The edited view of the document comprises a sequence of the plurality of view area sizes. Each of the plurality of view area sizes are separated by one of a plurality of interactive virtual boundary lines. Each of the plurality of interactive virtual boundary lines has an indicator, thus forming a plurality of indicators.

Process 700 can then detect an interaction with a boundary line separating two of the plurality of view area sizes (step 750). The first boundary line is associated with at least one of the adjacent view area sizes. In one illustrative embodiment, the interaction with the boundary line can be an interaction with either an upper boundary, or a lower boundary, such as upper boundary 412 and lower boundary 414 of FIG. 4.

Responsive to detecting the interaction with the boundary line, process 700 can resize an adjacent view area size (step 760). Process 700 can then return to step 740 and will display the edited view document, now with the resized view area size.

Returning again to step 740, process 700 can detect an interaction with one of the plurality of indicators (step 770). Responsive to detecting an interaction with an indicator, process 700 removes the associated view area size from the sequence from the edited view document (step 780). Process 700 can then return to step 740 and will display the edited view document, without the removed view area size.

Thus the illustrative embodiments describe a computer implemented method searches for keywords within a document and displays a surrounding context. A keyword search term and a view area size for the document are received. A plurality of occurrences of the search term is identified within the document. A view area size surrounding each occurrences of the search term is identified to form a plurality of view area sizes. An edited view of the document is displayed. The edited view includes a sequence of the plurality of view area sizes, wherein each of the plurality of view area sizes are separated by one of a plurality of interactive virtual boundary lines, and each of the a plurality of interactive virtual boundary lines have an indicator to form a plurality of indicators.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for searching for a keyword within a document, the method comprising:

receiving a keyword search term and a view area size for the document, wherein the view area size is a desired amount of context expressed in characters, lines of text or sentences;

identifying a plurality of occurrences of the search term within the document, and the view area size surrounding each of the plurality of occurrences of the search term to form a plurality of view area sizes; and displaying an edited view of the document, the edited view comprising a sequence of the plurality of view area sizes, wherein each of the plurality of view area sizes are separated by one of a plurality of interactive bifurcated boundary lines, each of the plurality of interactive bifurcated boundary lines having a conceal/reveal indicator to form a plurality of conceal/reveal indicators, wherein each of the conceal/reveal indicators is a graphical indication of an amount of the document that is concealed between sequential view areas of the plurality of view area sizes.

2. The computer implemented method of claim 1, further comprising:

detecting an interaction with an upper boundary of a first bifurcated boundary line of the plurality of interactive bifurcated boundary lines, wherein the upper boundary of the first bifurcated boundary line is associated with a first view area size of the plurality of view area sizes; and responsive to detecting an interaction with the upper boundary of the first bifurcated boundary line, resizing the first view area size;

updating the reveal/conceal indicator associated with the first bifurcated boundary line to show an updated graphical indication of an amount of the document that is concealed between the first view area size and a second view area size of the plurality of view area sizes;

detecting an interaction with a lower boundary of the first bifurcated boundary line of the plurality of interactive bifurcated boundary lines, wherein the lower boundary of the first boundary line is associated with the second view area size of the plurality of view area sizes; and responsive to detecting an interaction with the lower boundary of the first bifurcated boundary line, resizing the second view area size.

3. The computer implemented method of claim 1, further comprising:

wherein each conceal/reveal indicator of the plurality of conceal/reveal indicators includes a close indicator;

detecting an interaction with a first close indicator of the plurality of close indicators wherein the first bifurcated boundary line is associated with a first view area size of the plurality of view area sizes; and responsive to detecting an interaction with the first close indicator, removing the first view area size from the sequence of the plurality of view area sizes.

\* \* \* \* \*